US010148479B2

(12) United States Patent
Dore

(10) Patent No.: US 10,148,479 B2
(45) Date of Patent: Dec. 4, 2018

(54) OFDM TRANSMITTER WITH FILTER BANKS AND CORRESPONDING TRANSMISSION/RECEPTION SYSTEM

(71) Applicant: COMMISSARIAT A L'ENERGIE ATOMIQUE ET AUX ENERGIES ALTERNATIVES, Paris (FR)

(72) Inventor: Jean-Baptiste Dore, Fontanil-Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/708,987

(22) Filed: Sep. 19, 2017

(65) Prior Publication Data

US 2018/0083814 A1    Mar. 22, 2018

(30) Foreign Application Priority Data

Sep. 21, 2016    (FR) ..................... 16 58866

(51) Int. Cl.
*H04B 15/00* (2006.01)
*H04L 25/03* (2006.01)
(Continued)

(52) U.S. Cl.
CPC ...... *H04L 27/264* (2013.01); *H04L 25/03343* (2013.01); *H04L 27/265* (2013.01);
(Continued)

(58) Field of Classification Search
USPC .................. 375/220, 222, 229–236, 240, 375/240.26–240.29, 254, 259, 285, 284,
(Continued)

(56) References Cited

U.S. PATENT DOCUMENTS 5,483,529 A * 1/1996 Baggen ............... H04L 27/2653
370/484
6,389,062 B1 * 5/2002 Wu ................... H04L 25/03159
375/222
(Continued)

FOREIGN PATENT DOCUMENTS

FR        3 013 928 A1    5/2015

OTHER PUBLICATIONS

U.S. Appl. No. 14/318,838, filed Jun. 30, 2014, 2015/0009906 A1, Jean-Baptiste Dore et al.
(Continued)

*Primary Examiner* — Linda Wong
(74) *Attorney, Agent, or Firm* — Oblon, McClelland, Maier & Neustadt, L.L.P.

(57) ABSTRACT

An FBMC transmission/reception system wherein a phase pre-compensation and an amplitude pre-compensation are done on a block of modulation symbols. The symbol block thus compensated is segmented into a number M of sub-blocks equal to the number of carriers of an FBMC modulator. The sub-blocks are divided into vectors with size N/2 and padded with isolation zeroes to form padded vectors with size N. Each of these padded M is processed by an IFFT to give time sequences to which cyclic prefixes and suffixes are added. The resulting cyclic sequences are then input to the M input channels of the FBMC modulator. The reception symbols can be recovered at the receiver by a simple FFT with size NM/2.

12 Claims, 11 Drawing Sheets

(51) Int. Cl.
*H04L 27/26* (2006.01)
*H04L 27/36* (2006.01)

(52) U.S. Cl.
CPC ...... *H04L 27/2628* (2013.01); *H04L 27/2633* (2013.01); *H04L 27/2698* (2013.01); *H04L 27/368* (2013.01)

(58) Field of Classification Search
USPC ....... 375/295, 296, 297, 299, 316, 346, 347, 375/348, 350, 354
See application file for complete search history.

(56) References Cited

U.S. PATENT DOCUMENTS

| | | | | |
|---|---|---|---|---|
| 6,452,987 | B1* | 9/2002 | Larsson | H04L 25/03159 375/229 |
| 6,549,512 | B2* | 4/2003 | Wu | H04L 27/2608 370/210 |
| 6,724,331 | B1* | 4/2004 | El-Ghoroury | H03M 1/0626 341/118 |
| 7,936,851 | B2* | 5/2011 | Renfors | H04B 3/14 375/346 |
| 8,102,924 | B2* | 1/2012 | Pisoni | H04L 25/03159 370/352 |
| 2004/0252772 | A1* | 12/2004 | Renfors | H04L 27/26 375/260 |
| 2006/0095492 | A1* | 5/2006 | Brown | G06F 17/142 708/404 |
| 2009/0129493 | A1* | 5/2009 | Zhang | H04L 25/0236 375/260 |
| 2011/0075745 | A1* | 3/2011 | Kleider | H04L 25/03057 375/260 |
| 2011/0286497 | A1* | 11/2011 | Nervig | H04L 5/0021 375/147 |
| 2012/0300870 | A1* | 11/2012 | Dickey | H04L 27/12 375/295 |
| 2014/0286384 | A1* | 9/2014 | Mestre Pons | H04L 27/01 375/232 |
| 2015/0063507 | A1* | 3/2015 | Dore | H04L 25/03159 375/348 |
| 2015/0092827 | A1* | 4/2015 | Traverso | H04L 25/0224 375/224 |
| 2015/0139356 | A1* | 5/2015 | Song | H04L 27/264 375/296 |
| 2015/0146770 | A1* | 5/2015 | Dore | H04L 25/0204 375/232 |
| 2015/0155985 | A1* | 6/2015 | Lee | H04J 11/00 370/329 |
| 2015/0288439 | A1* | 10/2015 | Kim | H04B 7/0469 375/295 |
| 2015/0304001 | A1* | 10/2015 | Tomeba | H04B 7/04 375/267 |
| 2016/0036615 | A1* | 2/2016 | Hasegawa | H04L 27/2602 370/329 |
| 2017/0347340 | A1* | 11/2017 | Haley | H04L 25/0204 |
| 2018/0026823 | A1* | 1/2018 | Kumar | H04L 27/2646 |
| 2018/0139080 | A1* | 5/2018 | Kim | H04L 27/26 |
| 2018/0167939 | A1* | 6/2018 | Kim | H04L 27/26 |

OTHER PUBLICATIONS

U.S. Appl. No. 15/094,200, filed Apr. 8, 2016, 2016/0301554 A1, Jean-Baptiste Dore.
U.S. Appl. No. 15/208,971, filed Jul. 13, 2016, 2017/0019223 A1, Baher Mawlawi et al.
U.S. Appl. No. 15/485,700, filed Apr. 12, 2017, Jean-Baptiste Dore.
U.S. Appl. No. 15/485,723, filed Apr. 12, 2017, Jean-Baptiste Dore.
French Preliminary Search Report dated May 31, 2017 in French Application 16 58866 filed on Sep. 21, 2016 (with English Translation of Categories of Cited Documents).
Rostom Zakaria et al., "A Novel Filter-Bank Multicarrier Scheme to Mitigate the Intrinsic Interference: Application to MIMO Systems" IEEE Transactions on Wireless Communications, vol. 11, No. 3, March 2012, pp. 12.
Xiaojie Wang et al., "Pilot-aided Channel Estimation for Universal Filtered Multi-Carrier," Vehicular Technology Conference (VTC Fall), IEEE 82$^{nd}$, 2015, pp. 5.
Xiaojie Wang et al., "Universal Filtered Multi-Carrier with Leakage-Based Filter Optimization," European Wireless 2014, 20th European Wireless Conference, 2014, pp. 5.
Botaro Hirosaki, "An Orthogonally Multiplexed QAM System Using the Discrete Fourier Transform," IEEE Transactions on Communications, vol. Com-29, No. 7, Jul. 1981, pp. 8.
Pierre Siohan et al., "Analysis and Design of OFDM/OQAM Systems Based on Filterbank Theory," IEEE Transactions on Signal Processing, vol. 50, No. 5, May 2002, pp. 14.
M. Bellanger et al., "FBMC physical layer: a primer," PHYDYAS, 2010, pp. 31.

* cited by examiner

Background

OFDM TRANSMITTER WITH FILTER BANKS AND CORRESPONDING TRANSMISSION/RECEPTION SYSTEM

TECHNICAL DOMAIN

This invention generally relates to the field of OFDM (Orthogonal Frequency Division Multiplexing) telecommunication systems and also the field of telecommunication systems using a Filter Bank Multi-Carrier modulation, also called FBMC systems.

STATE OF PRIOR ART

Telecommunication systems using multi-carrier modulation are well known in the state of the art. The principle of such modulation consists of dividing the transmission band into a plurality of frequency sub-channels associated with sub-carriers and modulating each of these sub-carriers with the data to be transmitted.

The most widespread multi-carrier modulation is undoubtedly OFDM (Orthogonal Frequency Division Multiplexing) modulation. This modulation is used in WLAN, Wifi wireless local networks, in high speed wireless Internet access (WiMAX), digital radio broadcasting systems (DVB-T, ISDB-T, DAB), asymmetric digital links (xDSL), cell networks (LTE), etc.

In an OFDM transmission system, each block of OFDM symbols is preceded by a guard interval or a cyclic prefix longer than the time spread of the pulse response of the channel, so as to eliminate inter-symbol interference. However, the insertion of a guard interval or a prefix causes a loss of spectral efficiency. Finally, OFDM modulation is not an optimum solution for applications requiring high out-of-band rejection rates because the spectral occupancy of an OFDM signal is significantly larger than the band of sub-carriers that it uses due to spreading of secondary lobes.

More recently an FBMC (Filter Bank Multi Carrier) modulation was proposed as an alternative to OFDM modulation.

The principle of FBMC modulation is based on a synthesis by filter bank on transmission and an analysis by filter bank on reception. Transmission and reception filters are versions of a prototype filter offset in frequency and in time.

An introduction to FBMC modulation is given in the article by B. Hirosaki entitled "*An orthogonally multiplexed QAM system using the discrete Fourier transform*" published in IEEE Trans on Comm., vol. 29 No. 7, pp. 982-989, July 1981, and in the article by P. Siohan et al entitled "*Analysis and design of OFDM/OQAM systems based on filterbank theory*" published in IEEE Trans. on signal processing, vol. 50, No 5, pp. 1170-1183, May 2002.

An FBMC transmission/reception system can be represented in the time domain, or also in the frequency domain. A description of these two representations is given in the application published in reference FR-A-3013928 submitted in the name of this applicant.

In general, if the real symbols to be transmitted (more precisely the real and imaginary parts of QAM symbols to be transmitted) are denoted $a_{k,n}$, in which k is the index of the sub-carrier and n is the index of the symbols block, the signal emitted by the FBMC transmitter can be written in the following form:

$$s(m) = \sum_{k=0}^{M-1} a_{k,n} \tilde{g}_{k,n}(m) \quad (1)$$

in which $$\tilde{g}_{k,n}(m) = g_{k,n}(m) e^{j\phi_{k,n}} = g(m - nM/2) e^{j\frac{2\pi}{M}k(m-D/2)} e^{j\phi_{k,n}} \quad (2)$$

$g_{k,n}(m)$ is a version of the prototype filter response offset in time and in frequency, g(m) is the response of the prototype filter, M is the number (even, preferably a power of 2) of sub-carriers, D=KM−1 in which K is the coverage factor of the synthesis filters, or equivalently the pulse response duration of the prototype filter.

The $e^{j\phi_{k,n}}$ factor with $$\phi_{k,n} = \frac{\pi}{2}(n+k) - \pi nk$$

is a phase term representing the OQAM modulation, n is a time index.

The $g_{k,n}(m)$, k=0, . . . , M−1 set represents the response of the transmultiplexer filter. The $\tilde{g}_{k,n}(m)$, k=0, . . . , M−1 set represents this same response, except that its elements are weighted in time and in frequency by phase terms $e^{j\phi_{k,n}}$.

Assuming that the channel is flat and has no delay, the response of the transmultiplexer filter of the receiver corresponding to a unit excitation of the time-frequency pair $(n_0, k_0)$ in which $n_0$ is a time index and $k_0$ is a sub-carrier index, is given by:

$$r_{k',n'} = \sum_{m=-\infty}^{+\infty} \tilde{g}_{k_0,n_0}(m) \tilde{g}^*_{k',n'} \quad (3)$$

$$= e^{j\pi(k_0+\delta k)\delta n} e^{-j\frac{\pi}{2}(\delta k+\delta n)}$$

$$\sum_{m=-\infty}^{+\infty} g(m) g(m - \delta n \cdot M/2) e^{j\frac{2\pi}{M}\delta k(\frac{D}{2}m)}$$

in which $\delta n = n' - n_0$ and $\delta k = k' - k_0$. The prototype filter is chosen such that its pulse response g(m),m∈Z Z satisfies the real orthogonality condition:

$$\Re e\left(\sum_{m=-\infty}^{+\infty} \tilde{g}_{k',n'}(m) \tilde{g}^*_{k,n}(m)\right) = \delta_{k,k'} \delta_{n,n'} \quad (4)$$

in which $\Re e$ is the real part and $\delta$ is the Kronecker symbol. It can be understood from expression (4) that interference affecting the real symbol $a_{k',n'}$ can be eliminated in that it is purely imaginary. More precisely, intrinsic interference, $I_{k',n'}$, in other words interference due to nearby symbols $a_{k,n}$, (k,n)∈$\Omega_{k',n'}$ in which $\Omega_{k',n'}$ is the time-frequency support of the response of the transmultiplexer filter centred on the $a_{k',n'}$ symbol, can be expressed as:

$$I_{k',n'} = \sum_{(k,n)\in\Omega_{k',n'}} a_{k,n} \sum_{m=-\infty}^{+\infty} \tilde{g}_{k,n}(m) \tilde{g}^*_{k',n'}(m) \quad (5)$$

This term is purely imaginary due to the OQAM modulation, in other words the alternation of real values and imaginary values due to the phase term $e^{j\phi_{k,n}}$ in expression (2).

However, the use of an OQAM modulation to assure real orthogonality on reception as mentioned above, has some disadvantages. The use of pilots for channel estimating is significantly more complicated than in OFDM. Similarly, Space Time Block Code (STBC) coding techniques for Multiple Input Multiple Output (MIMO) systems are not applicable because complex code coefficients destroy the real orthogonality property.

A variant of the FBMC modulation known as FFT-FBMC has been disclosed in the paper by R. Zakaria et al. entitled "*A novel filter-bank multicarrier scheme to mitigate the intrinsic interference: application to MIMO systems*", published in IEEE Trans. on Wireless Communications, vol. 11, No. 3, pp 1112-1123, to avoid the constraint on the real value affecting modulation symbols ($a_{k,n}$). This variant consists of eliminating intrinsic interference in the presence of complex modulation symbols by separating different symbol blocks in time using an IFFT, followed by the addition of a cyclic prefix, as in a classical OFDM modulation before the FBMC modulation.

More precisely, FIG. 1 diagrammatically illustrates an FFT-FBMC modulation system according to the state of the art;

The MN/2 modulation symbols (complex), $d_{k,n}$, to be transmitted are grouped together in the form of M blocks with size N/2, in which as before, M is the number of FBMC sub-carriers and N is the number of OFDM multiplex sub-carriers used. In the remainder of the description, we will reserve the term sub-carrier in the following description to refer to OFDM multiplex sub-carriers and we will use the term carrier for sub-carriers of the FBMC modulation.

Each block of N/2 modulation symbols is alternatively padded by N/2 padding zeroes at the beginning or at the end of the block (zero padding) in 110 so as to generate M blocks with size N. Each of these blocks M thus padded is processed by an IFFT with a size N IFFT in 120 to generate N time sequences. A cyclic prefix with length L is inserted as a header in each of the sequences in 130. More precisely, the L last samples in the sequence are inserted as a header in the sequence, in a manner known in itself. Interference between OFDM symbols is eliminated by choosing the length L of the prefix such that L≥2Δ where Δ=2K−1, in other words the length of the prefix is chosen to be larger than the time spread of the transmultiplexer response.

The (complex) symbols $a_{k,n}$ of these sequences are multiplied by the phase terms $e^{j\Phi_{k,n}}$ respectively (OQAM modulation) in 135. The symbols thus modulated, $a_{k,n}e^{j\Phi_{k,n}}$ are then supplied to the M input channels (corresponding to the M carriers) of a conventional FBMC modulator, 140.

After transmission on channel 150, the received signal is demodulated by a conventional FBMC demodulator, 160. Each of the M output channels (corresponding to the M carriers) supplies a sequence of samples. The samples of these sequences are multiplied by the phase terms $e^{-j\Phi_{k,n}}$ (OQAM demodulation) in the multipliers 165.

After OQAM demodulation, the L first samples corresponding to the prefix are eliminated in 170. Each of the sequences is then subjected to a size N FFT in 180 and the modulation symbols are then estimated on the active frequencies (in other words frequencies that have not been padded by zeroes).

The FFT-FBMC system in FIG. 1 is very useful because it can eliminate dependence on the real nature of the modulation symbols, while eliminating intrinsic interference.

However, there are two serious disadvantages with this system. Firstly, not all received sub-carriers have the same amplitude. The result is that some are more affected by noise than others and the channel estimating process must take account of this amplitude variation. The receiver structure is then complex, particularly due to the analysis filter bank in reception, which makes it difficult to implement in a mobile terminal.

Consequently, the purpose of this invention is to disclose a variant of the FMBC transmission/reception system that is independent of the real nature of modulation symbols while providing a remedy to the above-mentioned disadvantages. More specifically, one purpose of this invention is to disclose such an FBMC system comprising a receiver with a particularly simple structure that does not require any complex noise elimination and channel estimating measures.

PRESENTATION OF THE INVENTION

This invention is defined by a transmitter designed to transmit a frame of complex modulation symbols in the form of a matrix (D) with size (NM/2)×P of modulation symbols in which P is the frame length, M is an even number of carriers of an FBMC modulator and N is a number of sub-carriers of an OFDM multiplex, each column in the matrix being segmented by a segmentation module into M vectors with size N/2, each of said vectors being padded on each side by N/2 null elements to form a complete vector with size N, each padded vector being transformed in an IFFT module with size N to provide a temporal sequence to which a cyclic prefix and a cyclic suffix are concatenated, the cyclic temporal sequence thus obtained being output to an input channel of the FBMC modulator, said transmitter being configured such that a phase pre-compensation is made on the frame modulation symbols in a first compensation module and an amplitude pre-compensation is made on them in a second compensation module, before they are input to the segmentation module, the phase and amplitude pre-compensation being adapted to compensate for phase rotations and the attenuation applied to each sample of each cyclic sequence in the FBMC modulator.

According to a first embodiment, after concatenation with a cyclic prefix and a cyclic suffix, the cyclic temporal sequence thus obtained is modulated by an OQAM modulation by multiplication by a phase factor before being input to an input channel of the FBMC modulator.

In this case, the phase factor is given by $e^{j\Phi_{k,n}}$ in which $$\phi_{k,n} = \frac{\pi}{2}(n+k) - \pi nk$$

where k is the rank of the modulation channel and n is a temporal sample index in the cyclic sequence.

Each of said vectors is then advantageously padded by inserting N/2 null elements at the beginning of each vector. Alternatively, each of said vectors can be padded by inserting N/2 null elements at the end of each vector.

According to a second embodiment, said cyclic temporal sequence is supplied directly to said input channel of the FBMC modulator.

In this case, said vectors are padded by inserting N/4 null elements at the beginning and end of each vector, and then performing a circular offset of N/2 elements on each of the vectors thus padded, for even rank input channels.

Regardless of the embodiment, the phase pre-compensation is advantageously made by performing a Hadamard product of the modulation symbols matrix D and a matrix Ω with size (NM/2)×P for which the elements are phasors are defined as follows:

$$\Omega_{k\frac{N}{2}+p,t} = e^{j\pi k\alpha(t)} \cdot e^{-j\frac{\pi}{2}(\alpha(t)+k)} \cdot e^{j\theta(p)}$$

in which $\alpha(t)=N_{CP}+t(N+N_{CP}+N_{CS})$, $N_{CP}$ and $N_{CS}$ are the sizes of the cyclic prefix and the cyclic suffix respectively, $$\theta(p) = \arg\left(\sum_{t=0}^{KM-1} g(t)e^{-j2\pi\frac{(p-\frac{N}{4})t}{MN/2}}\right)$$

in which K is the coverage factor characteristic of the FBMC modulator and g(t) is the impulse response of the prototype filter used in the FBMC modulator.

Regardless of the embodiment, the phase pre-compensation is advantageously made by performing a Hadamard product of the modulation symbols matrix D and a matrix Γ with size (NM/2)×P for which the elements are defined as follows:

$$\Gamma_{k\frac{N}{2}+p,t} = \left(\left|\sum_{t=0}^{KM-1} g(t)e^{-j2\pi\frac{(p-\frac{N}{4})t}{MN/2}}\right|\right)^{-1}$$

in which K is the coverage factor characteristic of the FBMC modulator and g(t) is the impulse response of the prototype filter used in the FBMC modulator.

The invention also relates to a transmission/reception system comprising a transmitter like that defined above and a receiver; in which the receiver also comprises a sampler to sample the signal received in base band, a module to eliminate cyclic prefixes and suffixes, and an FFT module to perform an FFT with size NM/2 on the signal thus obtained every (N+N_{GI})M/2 samples, in which N_{GI} is the sum of the size of the cyclic prefix and the size of the cyclic suffix.

According to a first variant, the modulation symbols frame comprises a plurality of pilot symbols and the receiver comprises a channel estimator connected to the outputs from the FFT module to estimate channel coefficients for each sub-carrier, an equaliser at the output from the FFT module to receive said channel coefficients and equalising outputs from the FFT module to make a sub-carrier equalisation.

According to a second variant, the transmitter comprises a plurality of DFT modules before the phase and amplitude pre-compensation modules, each DFT module receiving symbol blocks addressed to or sent by a user, the modulation symbols matrix being obtained from the outputs from said DFT modules, and the receiver comprises the same plurality of IDFT modules downstream from the FFT module, each IDFT module of the receiver being associated with an DFT module of the transmitter and performing an IDFT with the same size as the FFT module at the output from the FFT module, to provide an estimate of said symbol blocks.

BRIEF DESCRIPTION OF THE DRAWINGS

Other characteristics and advantages of the invention will become clear after reading preferred embodiments of the invention, with reference to the appended figures among which.

DETAILED PRESENTATION OF PARTICULAR EMBODIMENTS

The basic concept of this invention is to perform an amplitude and phase pre-compensation at the input to an FFT-FBMC transmitter like that described above, so as to drastically reduce the complexity of the receiver. As we will see later, an FFT-FBMC transmitter provided with such pre-compensation can be considered to be equivalent to a OFDM transmitter with filter bank. We will then show that the receiver can be treated like a simple FFT. This is why we will indifferently refer to the system according to the invention as an FFT-FBMC system with phase/amplitude pre-compensation in transmission or as a Block Filtered OFDM (BF-OFDM) system.

Figure 1:
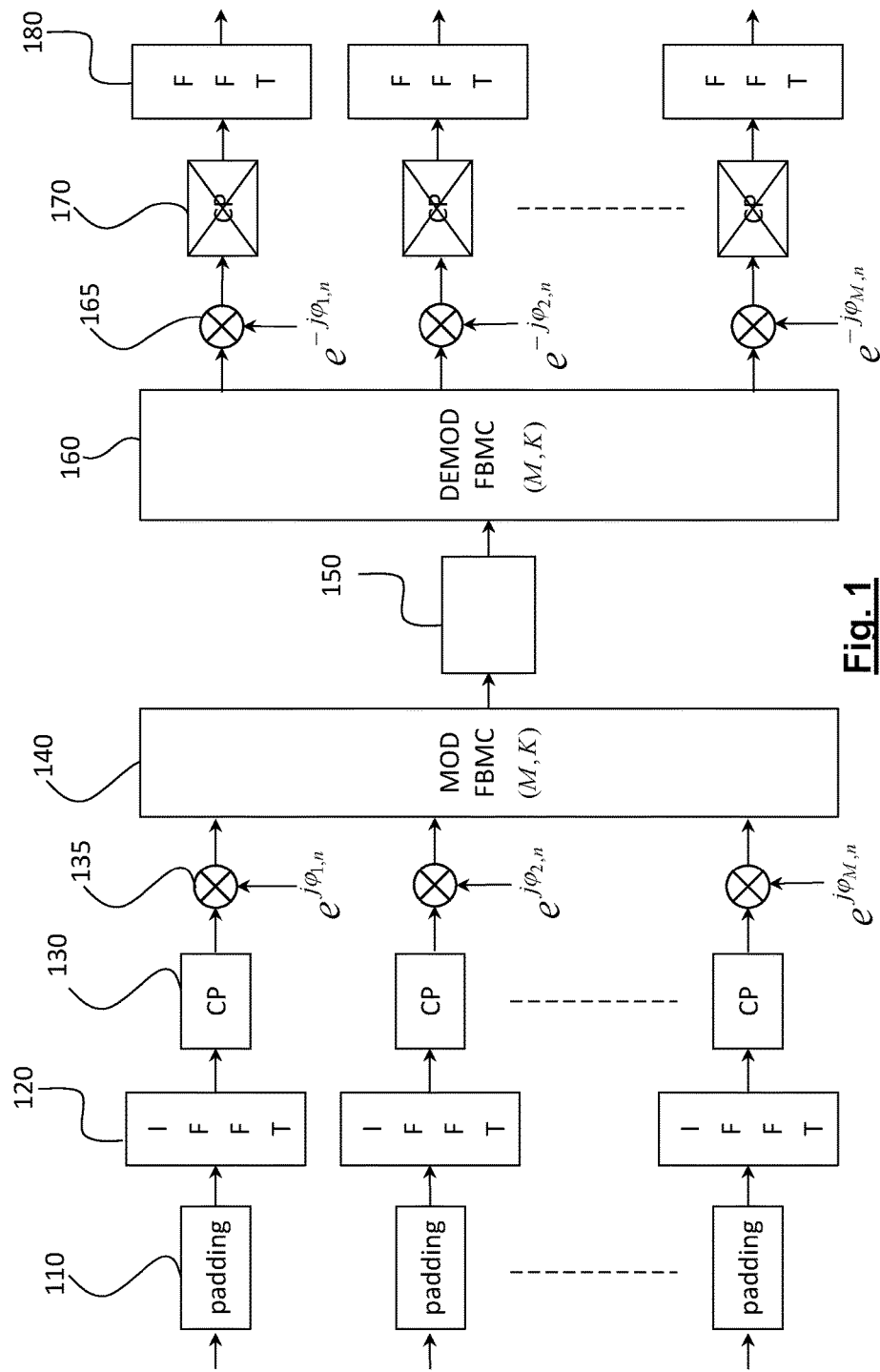
FIG. 1 diagrammatically shows a known FFT-FBMC transmission/reception system according to the state of the art.
Figure 2:
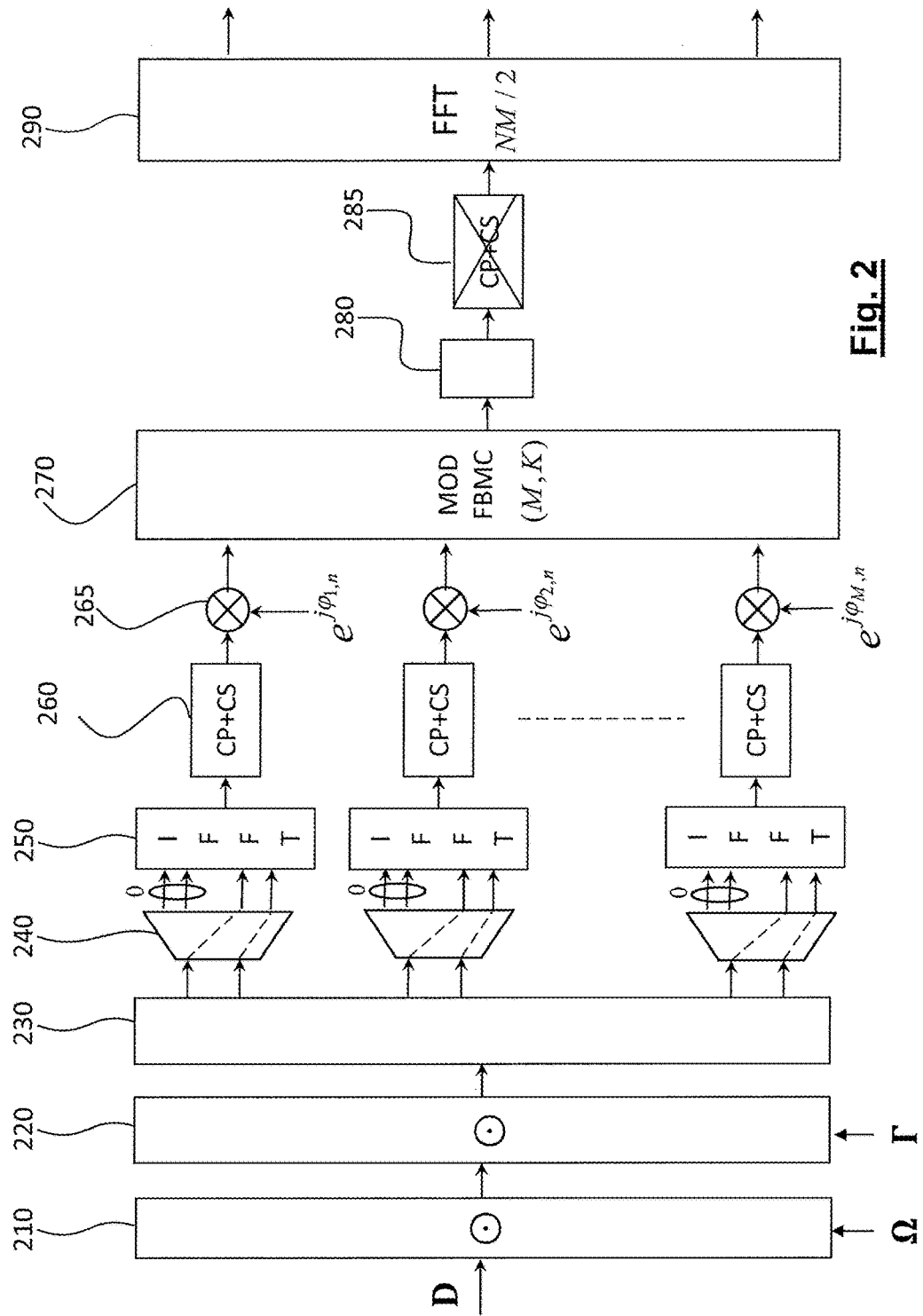
FIG. 2 diagrammatically represents a BF-OFDM transmission/reception system according to a first embodiment of the invention.

More precisely, FIG. 2 diagrammatically represents a BF-OFDM transmission/reception system according to a first embodiment of the invention.

The modulation symbols (complex) to be transmitted are formed from a set of P blocks with size MN/2. All these blocks can form a frame of length PMN/2. A frame can thus be considered as a matrix D with size (MN/2)×P, the elements of which are the modulation symbols in question.

Each frame of symbols is firstly processed by a phase pre-compensation in 210 and then an amplitude pre-compensation in 220. Note that the order in which the phase pre-compensation and the amplitude compensation are performed is indifferent. Furthermore the phase and amplitude pre-compensations can be combined in a single pre-compensation operation.

The phase pre-compensation in 210 can be represented by a matrix Ω with size (MV/2)×P, the elements of which are simple phasors. The element $\Omega_{k\frac{N}{2}+p,t}$ of the matrix $\Omega$, corresponding to the $$k\frac{N}{2}+p$$

-th row and the t-th column, in which k is the index of the carrier (FBMC), p is the index of the sub-carrier (OFDM) and t is the time index, is defined by:

$$\Omega_{k\frac{N}{2}+p,t} = e^{j\pi k\alpha(t)} \cdot e^{-j\frac{\pi}{2}(\alpha(t)+k)} \cdot e^{j\theta(p)} \quad (6)$$

in which:

$$\alpha(t)=N_{CP}+t(N+N_{CP}+N_{CS}) \quad (7)$$

where $N_{CP}$ and $N_{CS}$ are the sizes of the prefix and suffix respectively defined later and:

$$\theta(p) = \arg\left(\sum_{t=0}^{KM-1} g(t)e^{-j2\pi\frac{(p-\frac{N}{4})t}{MN/2}}\right) \quad (8)$$

where g(t) is the response of the prototype filter.

The first two multiplication terms involved in the phase compensation (6) are aimed at correcting the phase rotation on each of the carriers due to the phase terms $e^{j\Phi_{k,n}}$ involved in the FBMC modulation (see expression (2)).

Note that these two multiplication terms are independent of which FBMC sub-carrier is considered.

The third multiplication term involved in the phase pre-compensation (6) is aimed at correcting each of the phase shift sub-carriers introduced by the prototype filter of the FBMC modulator. It will be noted that this correction is independent of the carrier.

The phase pre-compensation is done by the Hadamard product of the modulation symbols matrix D and the phase compensation matrix $\Omega$.

Similarly, the amplitude pre-compensation in 220 can be represented by a matrix $\Gamma$ with size (MN/2)×P, the elements of which are scalar factors. The element $$\Gamma_{k\frac{N}{2}+p,t}$$

of the matrix $\Gamma$, corresponding to the $$k\frac{N}{2}+p$$

-th row and the t-th column in which k is the index of the carrier (FBMC), p is the index of the sub-carrier (OFDM) and t is the time index, is defined by:

$$\Gamma_{k\frac{N}{2}+p,t} = \left(\left|\sum_{t=0}^{KM-1} g(t)e^{-j2\pi\frac{(p-\frac{N}{4})t}{MN/2}}\right|\right)^{-1} \quad (9)$$

It will be noted that the amplitude pre-compensation does not depend on the index k of the carrier, and only on the index p of the sub-carrier. Therefore this compensation law is identical for each of the M carriers, provided that the same prototype filter is used for each of these carriers.

It would also be possible to choose the PHYDYAS filter described in the paper by Bellanger entitled "*FBMC physical layer: a primer-Phydias*" available on the www.ict-phydyas.org site, as the prototype filter. It is recalled that this is defined by:

$$g(t) = \sum_{q=0}^{K-1} G[q](-1)^{q+1}\cos\left(2\pi\frac{q-1}{M}t\right) \quad (10)$$

For example, for K=4 we have: G[0]=1; G[1]=0.97196; G[2]=√2/2; G[3]=√(1-G[1]²).

Other types of prototype filter could be envisaged without going outside the scope of the present invention, particularly a Gaussian filter or a raised cosine.

The amplitude pre-compensation is done by the Hadamard product of the modulation symbols matrix (in this case already compensated in phase) and the amplitude compensation matrix $\Gamma$.

Consequently, the result of the phase and amplitude pre-compensation is a matrix of size (MN/2)×P defined by:

$$D'=\Gamma \circ \Omega \circ D \quad (11)$$

where $\circ$ is the Hadamard product (element by element product) of two matrices.

The D' matrix of modulation symbols compensated in phase and in amplitude is then segmented in the segmentation module 230 to provide blocks with size N/2 at each instant t, M. More precisely, the segmentation module segments the column with index t into M column vectors $d'_{k,t}$, k=0, ..., M−1, the components of which are $$d'_{k\frac{N}{2}+i,t}, i=1, ..., \frac{N}{2}$$

in which:

$$d'_{k\frac{N}{2}+i,t} = d_{k\frac{N}{2}+i,t}\Omega_{k\frac{N}{2}+i,t}\Gamma_{k\frac{N}{2}+i,t} \quad (12)$$

Each of the M column vectors or blocks $d'_{k,t}$ is padded with isolation zeroes using multiplexing modules 240 to form padded vectors $\bar{d}'_{k,t}$, k=0, ..., M−1, with size N defined by:

$$\bar{d}'_{k,t} = \left(0, ..., 0, d'_{k\frac{N}{2}+1,t}, ..., d'_{(k+1)\frac{N}{2},t}\right)^T \quad (13-1)$$

In other words, each of the vectors $\bar{d}'_{k,t}$ is obtained by inserting N/2 zeroes before the components of vector $d'_{k,t}$.

According to one variant (not shown), N/2 isolation zeroes can be placed at the end of blocks d'$_{k,t}$ to obtain padded vectors d̄'$_{k,t}$ as follows:

$$\bar{d}'_{k,t} = \left(d'_{k\frac{N}{2}+1,t}, \ldots, d'_{(k+1)\frac{N}{2},t}, 0, \ldots, 0\right)^T \quad (13\text{-}2)$$

It will be seen that this variant is deduced from the previous variant and that a circular offset of N/2 is made on elements of the padded vectors.

Figure 3:
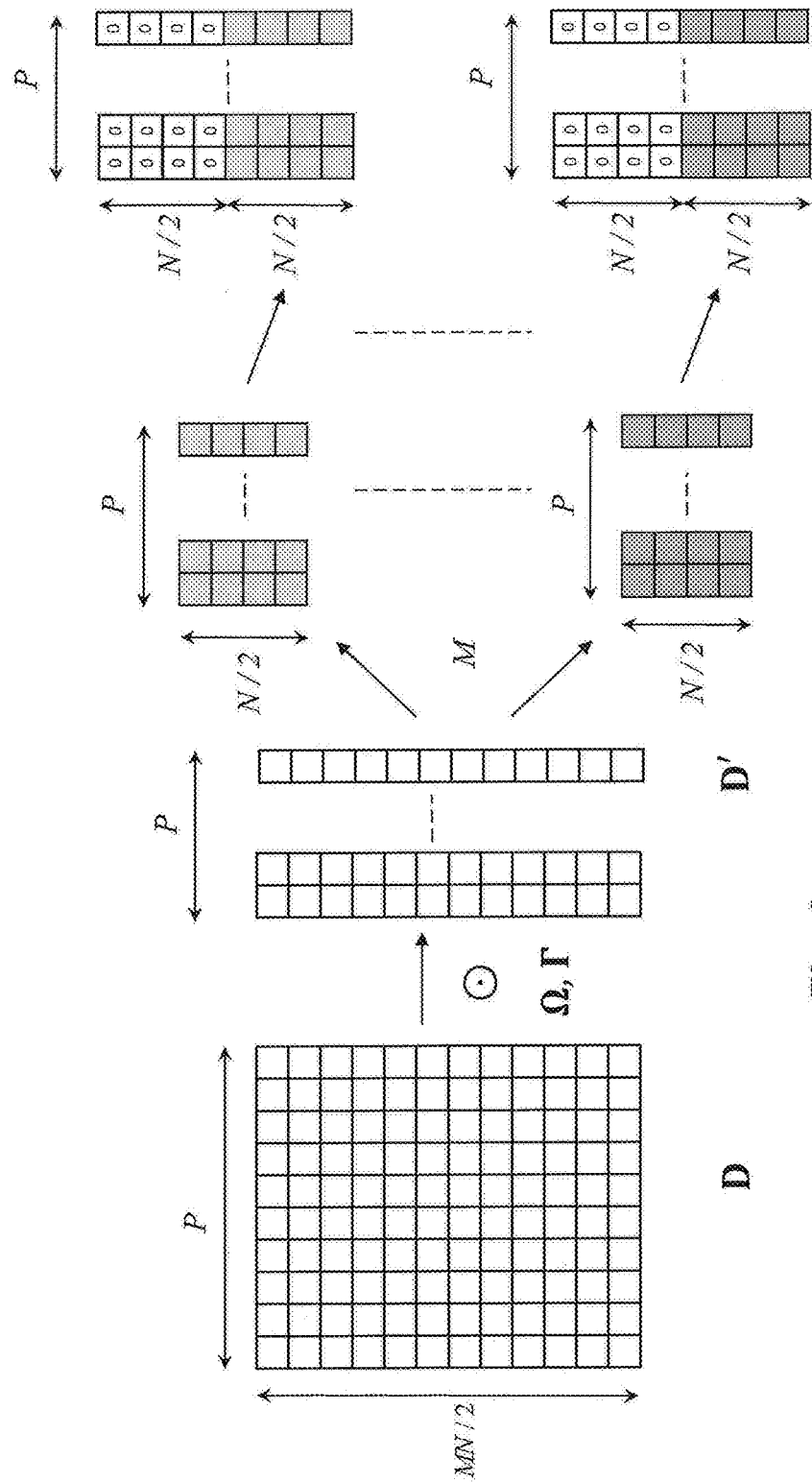
FIG. 3 diagrammatically represents processing of modulation symbols in the transmitter in FIG. 2.

FIG. 3 diagrammatically represents the processing of information symbols in the first embodiment to obtain the vectors d̄'$_{k,t}$, k=0, . . . , M−1.

The matrix D of information symbols at the input to module 210 is illustrated in 310. The different rows correspond to frequency indexes $$\left(k\frac{N}{2}+p\right)$$

and the different columns correspond to time indexes (t).

After element by element multiplication by the phase and amplitude compensation matrices, the matrix D' is obtained with the same size as matrix, in 320.

The matrix D' is segmented into M sub-matrices with size (N/2)×P. It is assumed herein that padding by isolation zeroes given by (13-1) will be used. Rows of zeroes are inserted above the rows of each sub-matrix N/2. In other words the columns of each of these sub-matrices are padded with N/2 zeroes at the beginning of each column to form padded vectors d̄'$_{k,t}$. It will be understood that two vectors d'$_{k,t}$ related to two successive carriers k and k+1 are thus isolated by N/2. The same result will be obtained if the padding variant defined by (13-2) is used.

Each padded vector d̄'$_{k,t}$, k=0, . . . , M−1, is then processed by an IFFT with size N in 250 to obtain a sequence of temporal sequences.

A cyclic prefix and a cyclic suffix are concatenated to each sequence of temporal samples in module 260. More precisely, the $N_{CS}$ first and the $N_{CP}$ last samples in this sequence are considered, the $N_{CP}$ last samples are copied to the start of said sequence and the $N_{CS}$ first samples are copied to the end of this sequence. The result is thus a cyclic sequence with length N+$N_{GI}$ in which $N_{GI}$=$N_{CP}$+$N_{CS}$ is the length of the guard interval between two successive sequences in time.

The isolation zeroes isolate the (M) different streams in the frequencies space. Similarly, the insertion of guard intervals isolates blocks in each stream in the time space. These two measures eliminate intrinsic interference for a flat channel with no delay.

After OQAM modulation in 265 (in other words after multiplication by the phase terms, $e^{j\Phi_{k,n}}$), the M cyclic sequences are supplied to the M input channels of an FBMC modulator, 270, characterised by the number of carriers M and the coverage factor K of the synthesis filters. The FBMC modulator can be implemented in the time domain or in the frequency domain as described in application FR-A-3013928 mentioned above.

It will be understood that the purpose of phase pre-compensation and amplitude pre-compensation is to compensate for the phase rotation and attenuation applied to each sample of each cyclic sequence in the FBMC modulator.

The output signal from the FBMC modulator is transmitted on channel 280, after transposition into the RF band.

On reception, after transposition into base band, the signal is sampled at a rate of M·Δf (sampler not shown) in which Δf is the inter-carrier space (FBMC).

The samples are then processed by a FFT with size NM/2 every (N+$N_{GI}$)M/2 samples, in other words the samples corresponding to the guard intervals are eliminated in 285.

The output blocks from the FFT module 290 supply an estimate of the transmitted information symbols, $$\hat{d}_{k\frac{N}{2}+i,t}$$

k=0, . . . , M−1, i=1, . . . , N/2.

In one practical application in which the transmitter is installed in a base station and the receiver is installed in a mobile terminal, the data stream on the down channel will use one or several FBMC carriers, or possibly a fraction of N/2 sub-carriers associated with an FBMC carrier. In all cases, the receiver will only recover the information symbols that concern it. Thus for example, if the information symbols addressed to the mobile terminal are carried by carrier index $k_0$, only outputs from FFT rank $$k_0\frac{N}{2}+p$$

in which p∈

$$\left[0, \frac{N}{2}\right[$$

will be taken into account.

Figure 4:
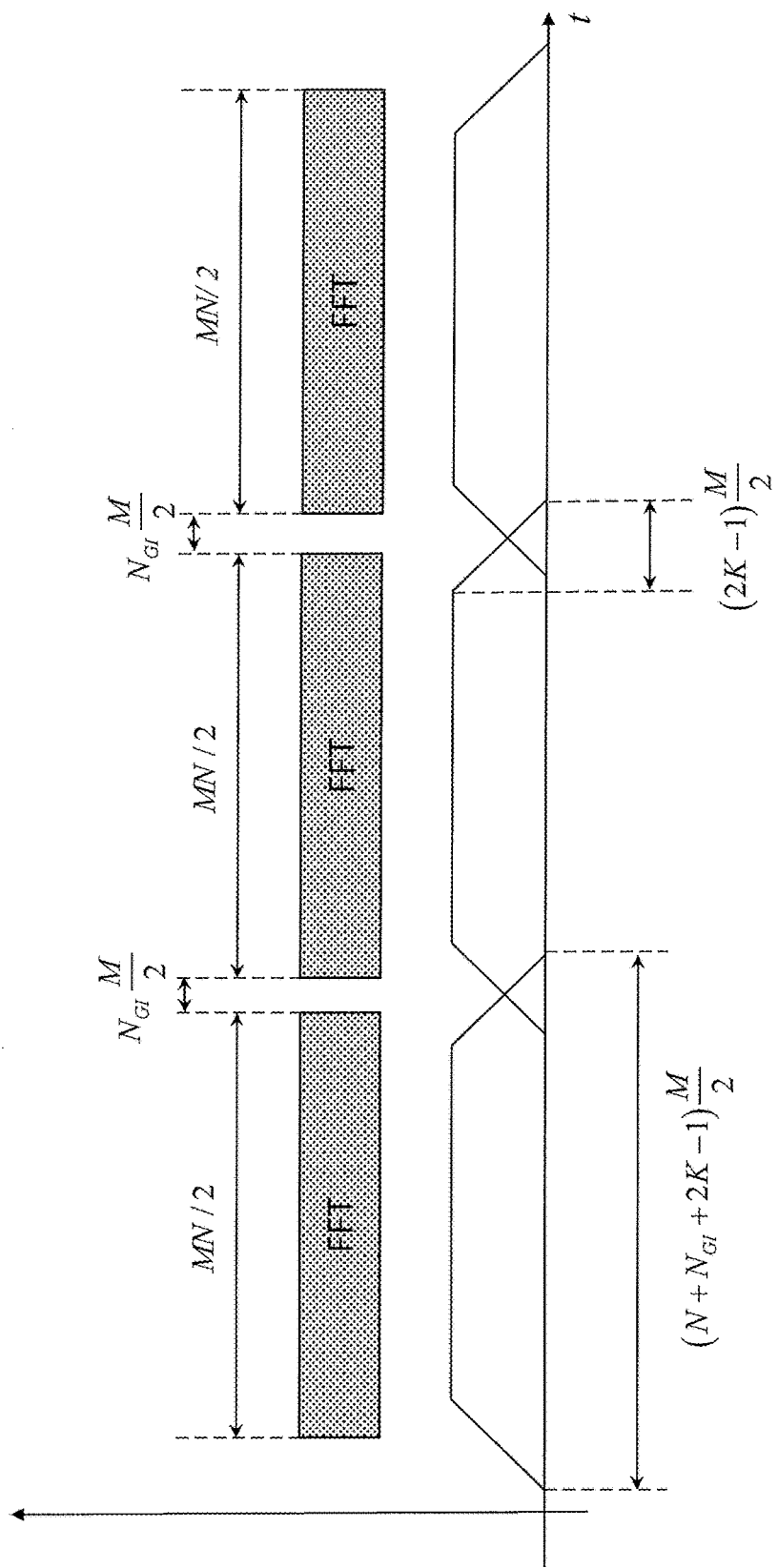
FIG. 4 diagrammatically represents the signal received by the receiver in FIG. 2.

FIG. 4 diagrammatically represents the time signal received by the receiver in FIG. 2;

The abscissas axis in this figure is the time axis and the ordinates axis is the amplitudes axis.

The received signal is composed of a sequence of OFDM symbols with a size of (N+$N_{GI}$)M/2+(2K−1)M/2 samples, the second term appearing in this expression being due to the pulse response of the prototype filter.

FFT windows with size NM/2 must be centred on OFDM symbols. Different OFDM modulation techniques known to an expert in the subject can be used.

The guard interval must satisfy two constraints, to prevent interference between OFDM symbols:

$$N_{GI} > 2K-1 \quad (14)$$

The purpose of constraint (14) is to prevent an overlap in time due to the pulse response queue of the prototype filter. In practice, a guard interval much smaller than that imposed by condition (14) can be chosen provided that the resulting degree of interference is small enough to enable demodulation.

Figure 5:
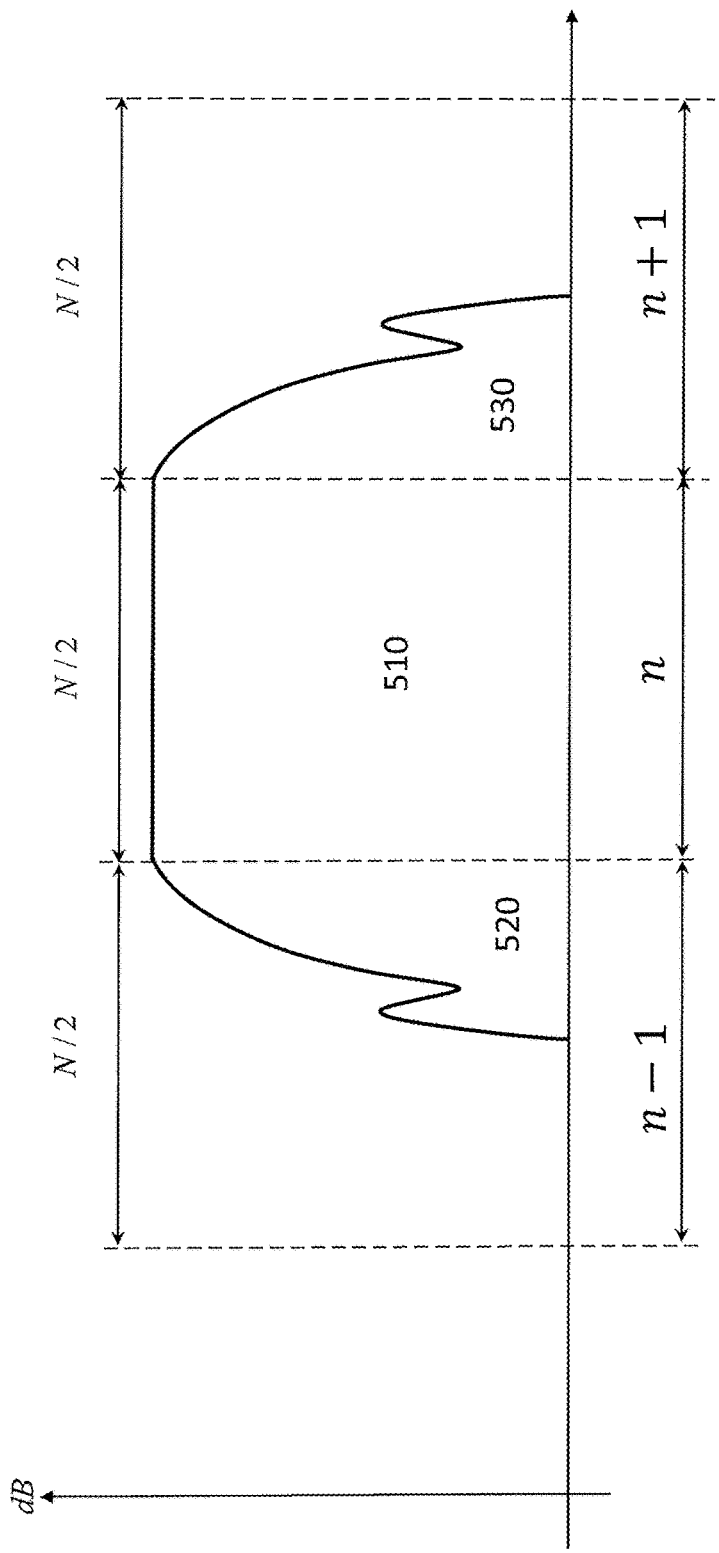
FIG. 5 represents a portion of the spectrum of the signal received by the receiver in FIG. 2, for two adjacent carriers.

FIG. 5 represents a portion of the spectrum of the signal received by the receiver in FIG. 2, for three successive carriers, n−1, n, n+1.

It is assumed that the same modulation symbol was transmitted on sub-carriers associated with carrier rank n and that null symbols were transmitted on sub-carriers associated with carrier ranks n−1 and n+1.

It is assumed that the channel is flat.

In this case the spectrum is represented around carrier n. The band width, 510, is size N/2. It can be seen that the spectrum is perfectly flat and that there is no attenuation in this band. This is due to the amplitude pre-compensation within the transmitter, upstream from the FBMC modulation.

On the other hand, outside band n, the received signal contains secondary lobes in a first zone 520, with size N/4, in band n−1 and in a second zone, 530, also with size N/4, in band n+1. The amplitude of these secondary lobes is small in comparison with the useful signal.

It can thus be seen that two adjacent bands such as n−1,n or n,n+1 interfere only slightly.

The flat response in the transmission band enables a direct channel estimate using pilot symbols and equalisation by sub-carrier as in a classical OFDM receiver.

Figure 6:
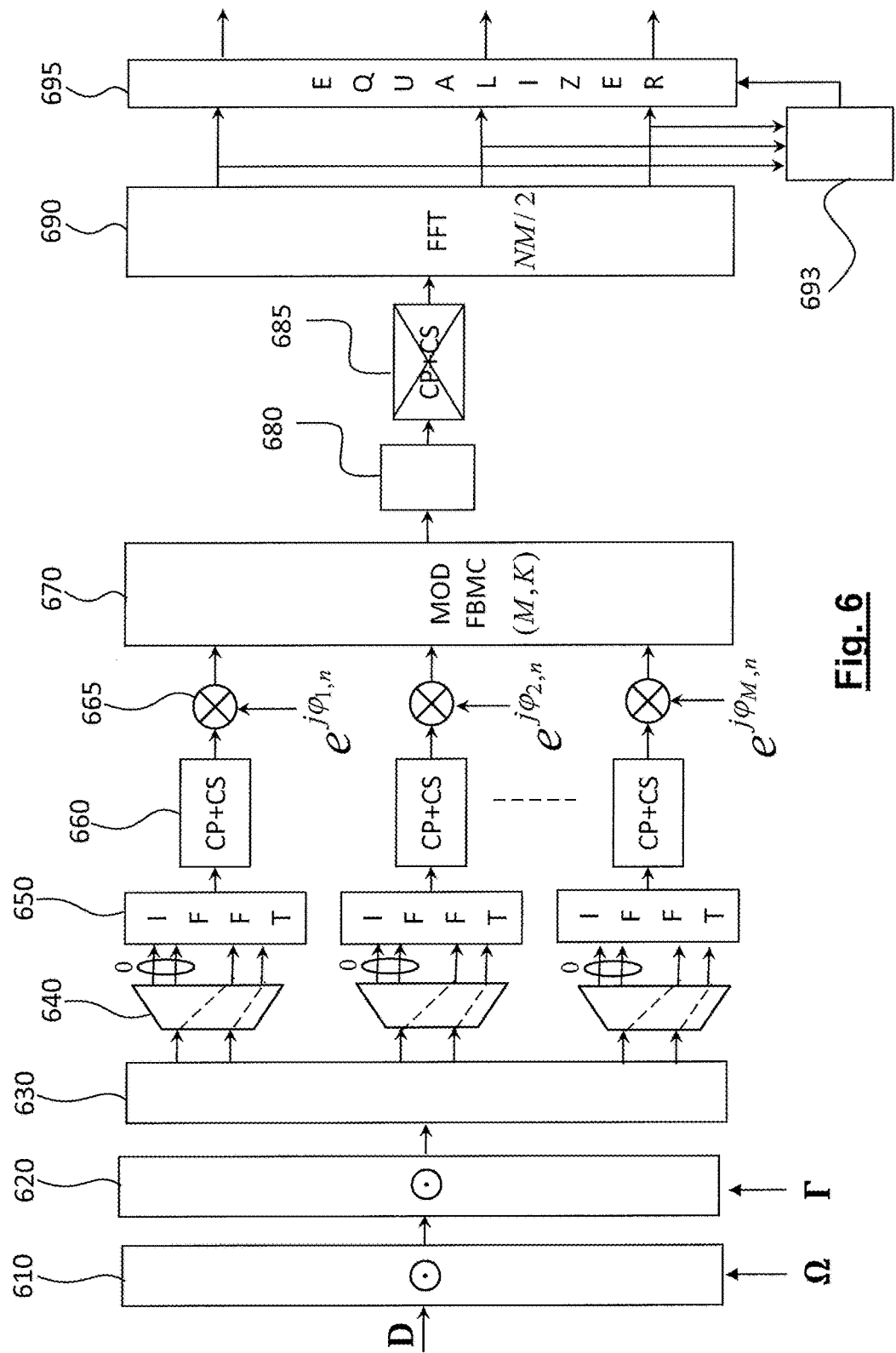
FIG. 6 diagrammatically represents a BF-OFDM transmission/reception system according to a first variant of the first embodiment of the invention.

FIG. 6 diagrammatically represents a BF-OFDM transmission/reception system according to a first variant of the first embodiment.

This first variant is different from the embodiment in FIG. 2 in that a channel equalisation is carried out sub-carrier by sub-carrier at the receiver.

References 610 to 690 denote elements identical to those with references 210 to 290 in FIG. 2.

The channel estimator 693 makes a channel estimate based on pilot symbols distributed in spectral bands around the carrier frequencies, namely $$k\frac{N}{2} + p, k = 0, \ldots, M-1, p \in \left[0, \frac{N}{2}\right[.$$

The channel attenuation coefficients are determined from pilot symbols supplied to the equaliser 695 that makes a sub-carrier by sub-carrier equalisation known in itself (for example ZF or MMSE).

Figure 7:
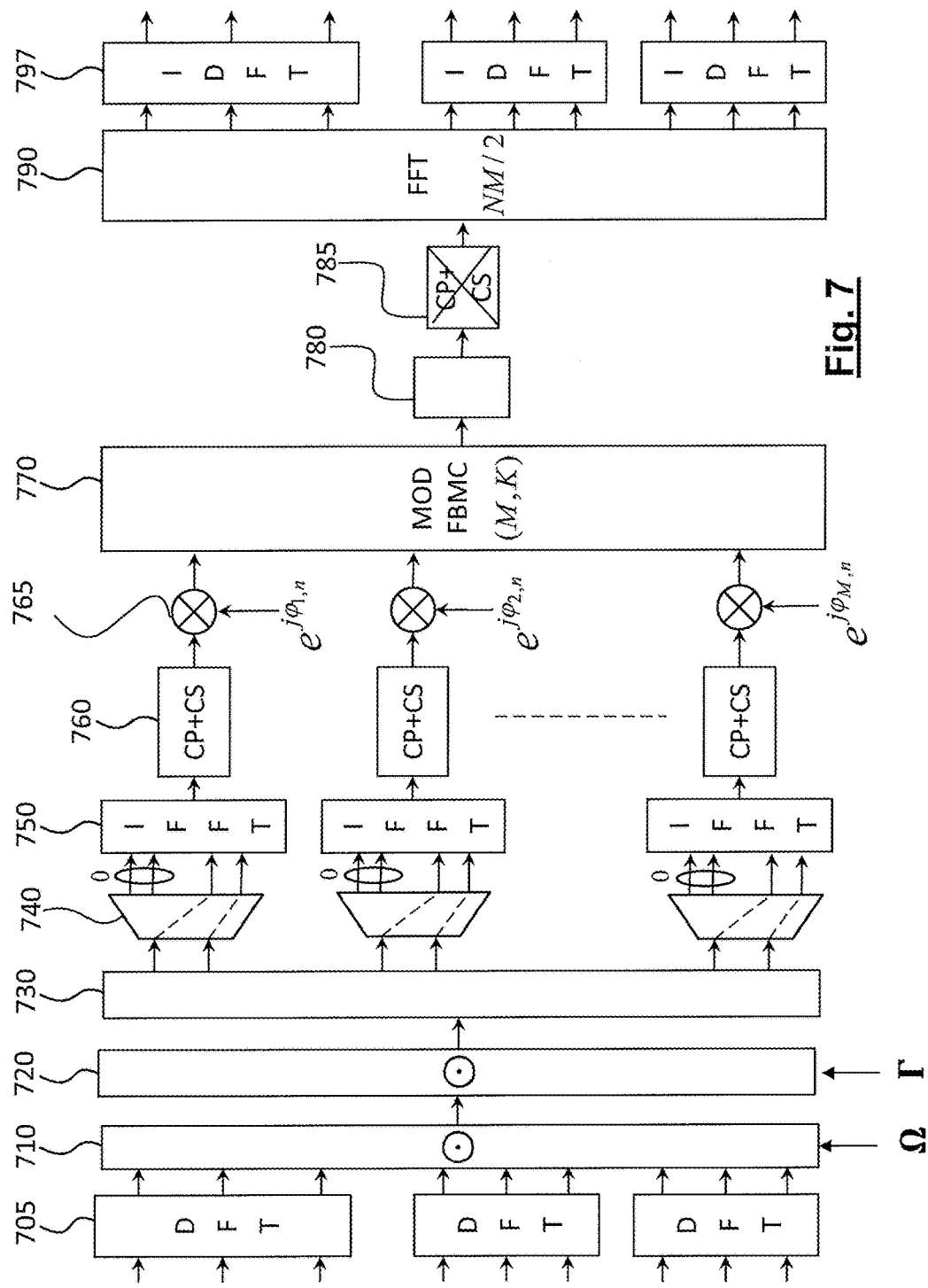
FIG. 7 diagrammatically represents a BF-OFDM transmission/reception system according to a second variant of the first embodiment of the invention.

FIG. 7 diagrammatically represents a BF-OFDM transmission/reception system according to a second variant of the first embodiment.

This second variant enables a reduction in the Peak to Average Power Ratio (PAPR) of the transmitted signal by making a Discrete Fourier Transform (DFT) of the symbols to be modulated before the phase and amplitude pre-compensation.

References 710 to 790 denote elements identical to those with references 210 to 290 in FIG. 2.

Unlike the system in FIG. 2, the transmitter includes DFT modules 705 before the phase pre-compensation module 710 and the amplitude pre-compensation module 720, spreading power in the frequency domain on a block of sub-carriers. Each module 705 offers relative access to a user in a manner similar to the Single Carrier FDMA (SC-FDMA) technique.

Thus for example, for an uplink, each module 705 performs a DFT on modulation symbols addressed to the base station, frequency samples at the output from the different modules 705 then being processed like elements of the matrix D. DFT sizes of modules 705 can be different depending on the flow required by (or for) the user.

Complementarily, on reception, an Inverse Discrete Fourier Transform (IDFT) is performed by block of sub-carriers in modules 797 to restore modulation symbols. IDFT sizes correspond to sizes of DFTs performed by modules 705.

A sub-carrier by sub-carrier equalisation according to the principle illustrated in FIG. 6 can also be applied in the receiver in FIG. 7, between the FFT module 790 and the IDFT modules 797.

In general, precoding techniques used in the OFDM field can also be applied in the transmission/reception system according to this invention. Thus, it can be envisaged to make an STBC coding on the input side of the phase and amplitude pre-compensation modules as in an MIMO-ODFM system, processing on reception being done in a conventional MIMO-OFDM receiver.

Figure 8:
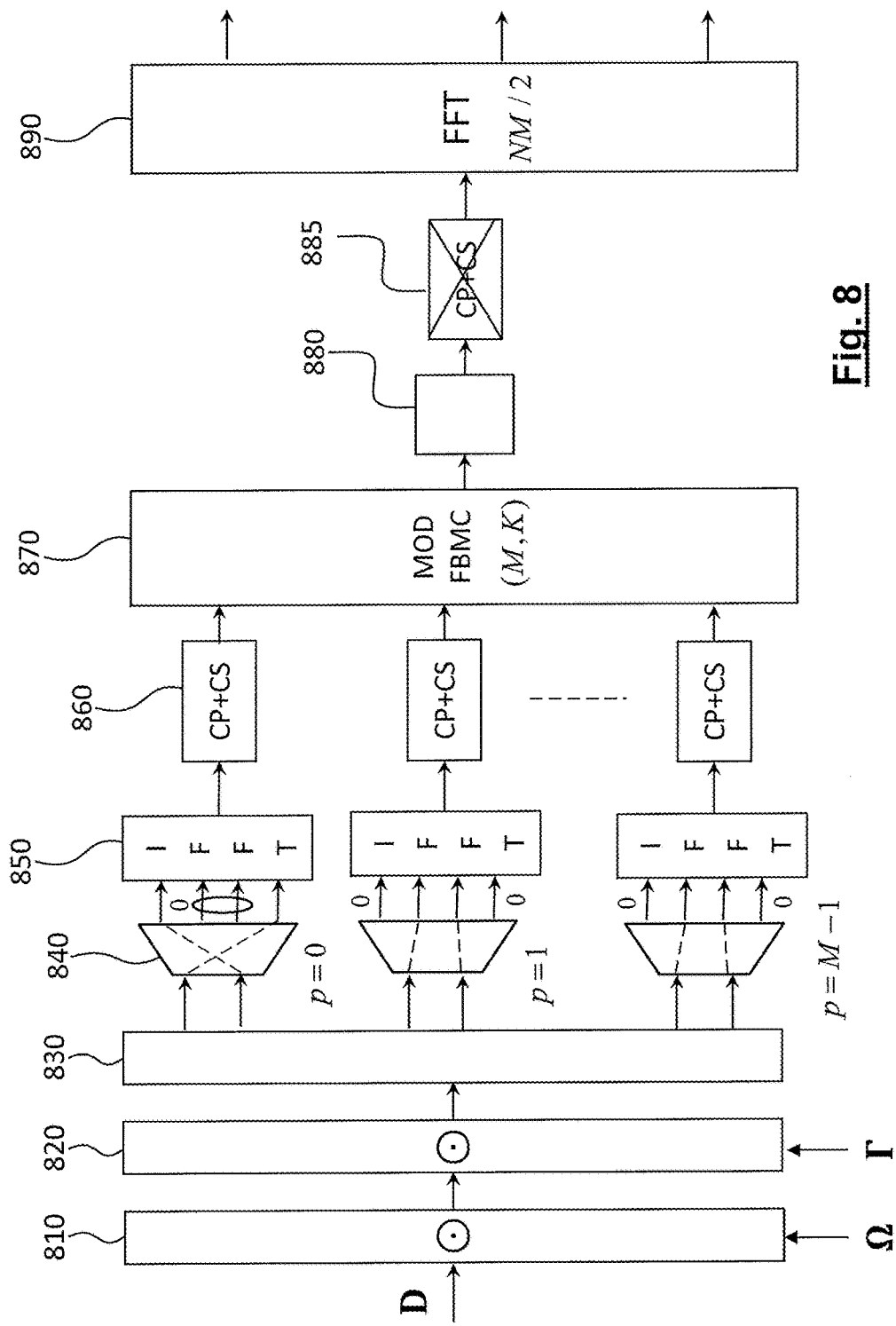
FIG. 8 diagrammatically represents a BF-OFDM transmission/reception system according to a second embodiment of the invention.

FIG. 8 diagrammatically represents a BF-OFDM transmission/reception system according to a second embodiment of the invention.

This second embodiment is different from the first in that the OQAM modulation (in other words multiplication by phase terms $e^{j\Phi_{k,n}}$) is deleted at the input to the FBMC modulator. Remember that multiplication by phase factors $e^{j\Phi_{k,n}}$ assures orthogonality within the FBMC modulator. As explained below, we were able to demonstrate that this modulation is not necessary provided that the construction of padded vectors is modified.

More precisely, modules 810-830, 850-890 in the second embodiment are identical to modules 210-230, 250-290 respectively in the first embodiment and therefore they will not be described again at this point. On the other hand, multiplexing modules 840 are different from multiplexing modules 240.

Each module 840 associated with an odd rank carrier, $$p = 2v+1, v = 0, \ldots, \frac{M}{2} - 1,$$

pads a vector $d'_{k,t}$ by inserting N/4 isolation zeroes on each side of its components to obtain a padded vector $\bar{d}'_{k,t}$, as follows:

$$\bar{d}'_{k,t} = \left(0, \ldots, 0, d'_{k\frac{N}{2}+1,t}, \ldots, d'_{(k+1)\frac{N}{2},t}, 0, \ldots, 0\right)^T \quad (15\text{-}1)$$

Conversely, each module 840 associated with an even rank carrier, p=2v, $$v = 0, \ldots, \frac{M}{2} - 1,$$

copies the N/4 first elements of the vector $d'_{k,t}$ to the N/4 last elements of the padded vector $\bar{d}'_{k,t}$ and the N/4 last elements of the vector $d'_{k,t}$ to the N/4 first elements of the padded vector $\bar{d}'_{k,t}$, and inserts N/2 isolation zeroes between these N/4 first and these N/4 last elements, as follows:

$$\bar{d}'_{k,t} = \left(d'_{k\frac{N}{2}+\frac{N}{4}+1,t}, \ldots, d'_{(k+1)\frac{N}{2},t}, 0, \ldots, 0, d'_{k\frac{N}{2}+1,t}, \ldots, d'_{k\frac{N}{2}+\frac{N}{4},t}\right)^T \quad (15\text{-}2)$$

Equivalently, the multiplexing module 840 associated with an even rank carrier inserts N/4 zeroes at the beginning and the end of each vector $d'_{k,t}$ to obtain a padded vector as in (15-1), and then makes a circular offset of N/2 elements onto the vector thus completed to obtain the vector $\bar{d}'_{k,t}$ defined in (15-2).

Figure 9:
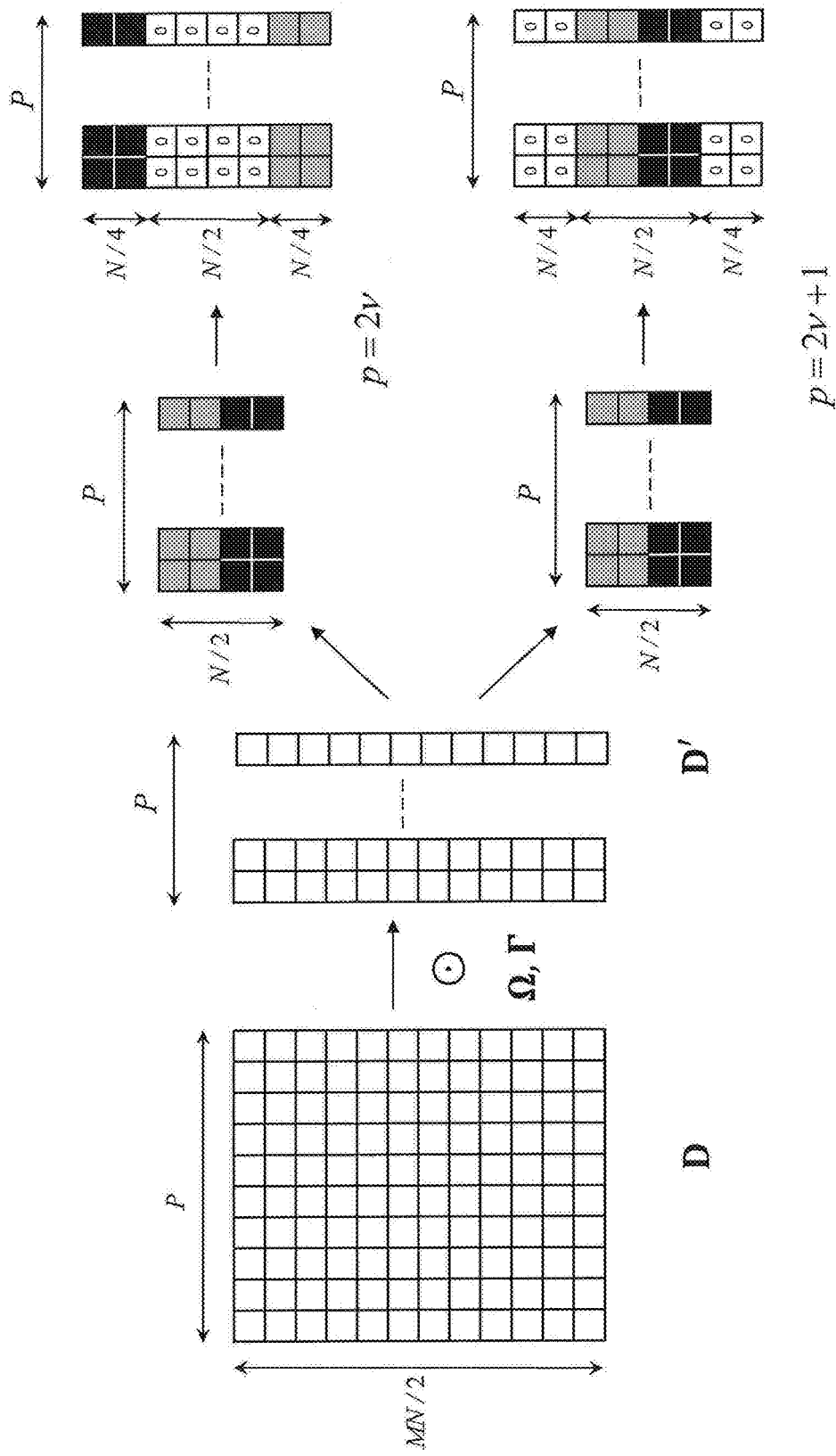
FIG. 9 diagrammatically represents processing of modulation symbols in the transmitter in FIG. 8.

FIG. 9 diagrammatically represents the processing of information symbols in the second embodiment to obtain the vectors $\bar{d}'_{k,t}$, k=0, ..., M−1.

The matrix D of information symbols at the input to module 810 is illustrated in 910. The different rows correspond to frequency indexes $$\left(k\frac{N}{2} + p\right)$$

and the different columns correspond to time indexes (t).

After element by element multiplication by the phase and amplitude compensation matrices, the matrix D' of the same size as matrix D is obtained in 820.

The matrix D' is segmented into M sub-matrices with size (N/2)×P, each sub-matrix being associated with a carrier and composed of P column vectors.

When the rank of the carrier is odd, each column vector in the sub-matrix is padded by N/4 isolation zeroes on each side to obtain a padded vector with size N.

When the rank of the carrier is even, each column vector is divided into two parts. The first part, composed of the N/4 first elements of this vector, is copied (in the same order) to the end of the vector $\overline{d}'_{k,t}$. The second part, composed of the N/4 last elements, is copied (in the same order) to the beginning of the vector $\overline{d}'_{k,t}$. Finally, N/2 isolation zeroes are inserted between the two copied parts to obtain the padded vector, $\overline{d}'_{k,t}$, with size N.

Figure 10:
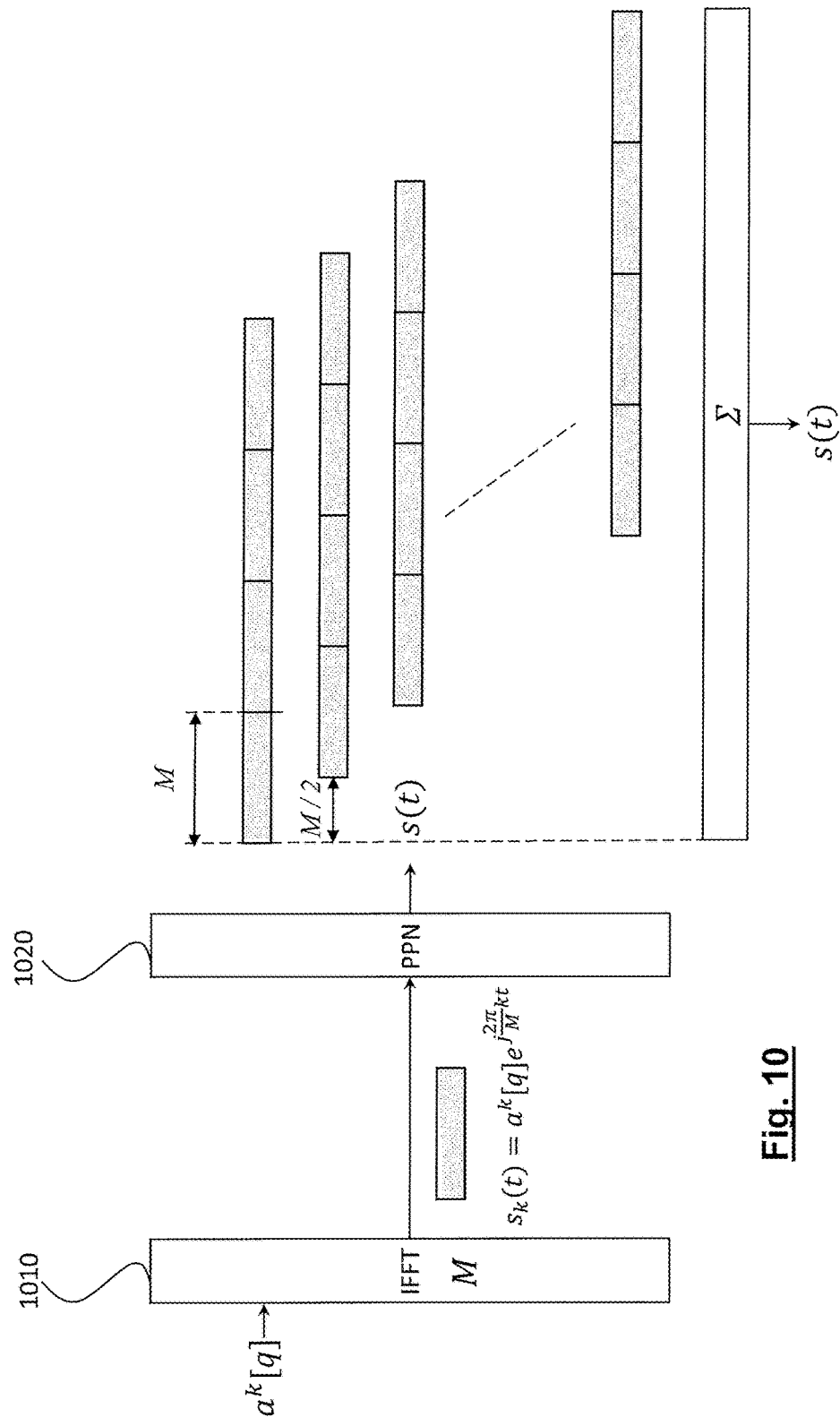
FIG. 10 diagrammatically represents a processing done by an FBMC transmitter, useful to understanding the second embodiment of the invention.
Figure 11:
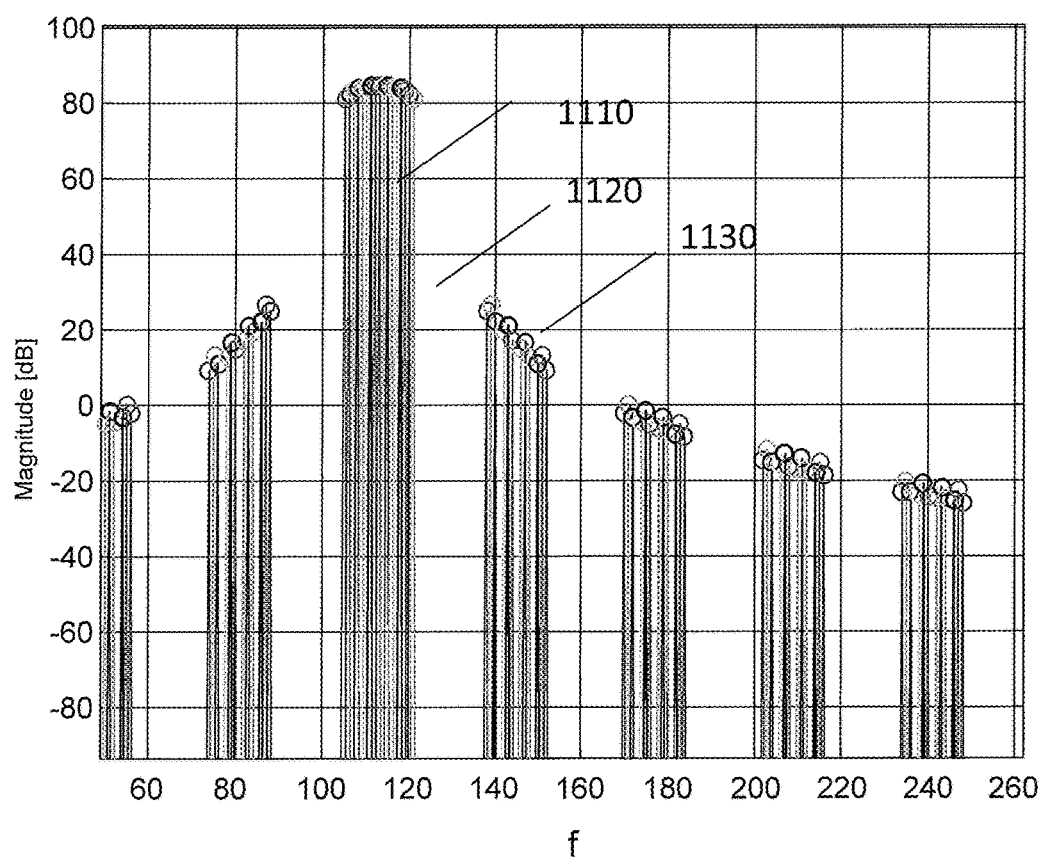
FIG. 11 represents a part of the spectrum of a signal transmitted by the transmitter in FIG. 8 when the modulation symbols are injected onto sub-carriers associated with an FBMC carrier.

We will now explain operation of the BF-OFDM system according to a second embodiment, with reference to FIGS. 10-11.

FIG. 10 illustrates a simplified form of an FBMC modulator, implemented in the time domain. This includes an IFFT module, 1010, with size M (number of FBMC carriers) followed by a polyphase filter bank 1020 constructed from the prototype filter.

It is assumed that symbols $a^k[q]$ are injected on carrier k in which q is the index of the block at the input to the IFFT module, and null symbols are injected on the other carriers. Consequently, the signal at the output from the IFFT module is a temporal signal:

$$s_k(t) = a^k[q]e^{j\frac{2\pi}{M}kt} \tag{16}$$

with duration T (interval between successive blocks), containing M samples. The output signal from the polyphase filter bank is the sum of the sequences of OFDM symbols offset by T/2, the duration of each OFDM symbol being equal to KT, as shown in the right part of the figure, in other words:

$$s(t) = \sum_{q=-K+1}^{K-1} a^k[q]g(t)e^{j\frac{2\pi}{M}k(t+q\frac{M}{2})} \tag{17}$$

In a conventional FBMC receiver, an FFT with size M is performed at the output from the analysis filter bank. In a BF-OFDM receiver according to the second embodiment, an FFT with size MN/2 is performed due to the frequency granularity introduced by the N OFDM sub-carriers. The number of samples to be taken into consideration is the number of N consecutive OFDM symbols offset by M/2, namely NM/2.

Considering insertion of the cyclic prefix resulting in a circular shape of the signal and the duration of the response of the prototype filter, it can be shown that the FFT output to carrier k is given by:

$$Y^k[f] = \sum_{q=0}^{N-1} a^k[q] \sum_{t=0}^{KM-1} g(t)e^{j\frac{2\pi}{M}kt}e^{-j\frac{2\pi}{NM/2}(t+qM/2)f} \tag{18}$$

$$Y^k[f] = \sum_{q=0}^{N-1} a^k[q] \sum_{t=0}^{KM-1} g(t)e^{-j\frac{2\pi}{NM/2}t(f-k\frac{N}{2})}e^{-j\frac{2\pi}{N}qf} \tag{19}$$

The result obtained by inverting the sum signs and calculating the FFT is:

$$Y^k[f] = G\left(f - k\frac{N}{2}\right)\sum_{q=0}^{N-1} a^k[q]e^{-j\frac{2\pi}{N}qf} \tag{20}$$

We will now assume that we inject a pure sine curve with frequency $$\frac{p}{T}$$

on the carrier k, such that $$a^k[q] = b^{k,p}e^{j\frac{2\pi}{N}pq},$$

where is the amplitude of the injected sine curve. The output from the FFT to carrier k is written:

$$Y^k[f] = G\left(f - k\frac{N}{2}\right)Nb^{k,p}D(f - p) \tag{21}$$

in which D is a Dirac comb with period N, in other words D(f−p)=1 if f−p is a multiple of N and D(f−p)=0 otherwise.

The spectral response of the prototype filter includes a relatively flat region with width N/2 and a high attenuation at multiples of N.

The frequency of the injected signal must represent the following constraint, so as to obtain low deformation of the signal injected on sub-carrier k and good rejection of interference:

$$k\frac{N}{2} - \frac{N}{4} \leq p[\text{mod. } N] < k\frac{N}{2} + \frac{N}{4} \tag{22}$$

If the rank of the carrier k is even, $$k\frac{N}{2} = 0$$

[mod. N], the constraint on the frequency of the sub-carrier can be reduced to $$-\frac{N}{4} \leq p[\text{mod. } N] < \frac{N}{4} \tag{23-1}$$

Conversely, if the rank of the carrier k is odd, $$k\frac{N}{2} = \frac{N}{2}[\mod N],$$

the constraint on the frequency of the sub-carrier can be reduced to $$\frac{N}{4} \leq p[\mod N] < \frac{N}{2} \text{ or } -\frac{N}{2} \leq p[\mod N] < -\frac{N}{4} \quad (23\text{-}2)$$

Thus, the multiplexing rules are the same as those used in modules 840 to obtain padded vectors $\overline{d}'_{k,t}$.

FIG. 11 illustrates an example spectrum at the output from the transmitter of the BF-OFDM signal in FIG. 8.

More precisely, it is assumed that symbols are injected on carrier with rank k=6. The number of carriers has been taken equal to M=128 and the number of sub-carriers (per carrier) equal to N=32. Since the rank is even, symbols were placed on sub-carriers $$\left[-\frac{N}{4} + kN, kN + \frac{N}{4}\right[.$$

Consequently, on reception, the rank of sub-carriers carrying the useful signal is between $$\left[-\frac{N}{4} + k\frac{N}{2}, k\frac{N}{2} + \frac{N}{4}\right[,$$

in other words [88,104[ (represented on FIG. 10 as [104, 120[ since the initial value was taken to be equal to 1).

The useful part 1110 is a central zone of the prototype filter in which the spectral response is relatively flat. Adjacent bands 1120 are empty due to rejection by the prototype filter. Bands 1130 correspond to interference generated by the useful signal 1110. However, since the interference level is less than 60 dB at the useful signal, this interference is very low.

Finally, an expert in the subject will realise that the first and second variants of the first embodiment described with reference to FIGS. 6 and 7 are also applicable to the second embodiment. Thus, it is possible to provide sub-carrier equalisation at the output from the FFT module 890 as in FIG. 6. Similarly, a DFT by blocks can be carried out on the modulation symbols before the phase/amplitude compensation 810-820 and an IDFT by blocks can be carried out on the output from the FFT module 890, so as to reduce the PAPR. Moreover, as for the first embodiment, these two variants can be combined.

The invention claimed is:

1. A transmitter, wherein:
the transmitter is configured to transmit a frame of complex modulation symbols in the form of a matrix (D) with size (NM/2)×P of modulation symbols wherein P is a frame length, M is an even number of carriers of a filter bank multi-carrier (FBMC) modulator and N is a number of sub-carriers of an orthogonal frequency division multiplexing (OFDM) multiplex, each column in the matrix being segmented by a segmentation module into M vectors with size N/2, each of said M vectors being padded on each side by N/2 null elements to form a complete vector of size N, each of said M padded vectors being transformed in an inverse fast Fourier transform (IFFT) module with size N to provide a temporal sequence to which acyclic prefix and a cyclic suffix are concatenated, a cyclic temporal sequence thus obtained being output to an input channel of the FBMC modulator, and wherein the transmitter is further configured to perform phase pre-compensation on the frame modulation symbols and amplitude pre-compensation on the frame modulation symbols, before the frame modulation symbols are input to the segmentation module, the phase and amplitude pre-compensation being configured to compensate for phase rotations and attenuation applied to each sample of each cyclic sequence in the FBMC modulator.

2. The transmitter according to claim 1, wherein after concatenation with the cyclic prefix and the cyclic suffix, the cyclic temporal sequence thus obtained is modulated by an offset quadrature amplitude modulation (OQAM) by multiplication by a phase factor before being input to the input channel of the FBMC modulator.

3. The transmitter according to claim 2, wherein the phase factor is given by $e^{j\phi_{k,n}}$ wherein $$\phi_{k,n} = \frac{\pi}{2}(n+k) - \pi nk$$

where k is a rank of a modulation channel and n is a temporal sample index in the cyclic sequence.

4. The transmitter according to claim 2, wherein each of said M vectors is padded by inserting N/2 null elements at a beginning of each of said M vectors.

5. The transmitter according to claim 2, wherein each of said M vectors is padded by inserting N/2 null elements at an end of each of said M vectors.

6. The transmitter according to claim 1, wherein said cyclic temporal sequence is supplied directly to said input channel of the FBMC modulator.

7. The transmitter according to claim 6, wherein said M vectors are padded by inserting N/4 null elements at a beginning and end of each of said M vectors, and then performing a circular offset of N/2 elements on each of the M vectors thus padded, for even rank input channels (k).

8. The transmitter according to claim 1, wherein the phase pre-compensation is made by performing a Hadamard product of the modulation symbols matrix D and a matrix Ω with size (NM/2)×P for which elements are phasors and are defined as follows:

$$\Omega_{k\frac{N}{2}+p,t} = e^{j\pi k\alpha(t)} \cdot e^{-j\frac{\pi}{2}(\alpha(t)+k)} \cdot e^{j\theta(p)}$$

in which $\alpha(t)=N_{CP}+t(N+N_{CP}+N_{CS})$, $N_{CP}$ and $N_{CS}$ are a size of the cyclic prefix and the cyclic suffix respectively, $$\theta(p) = \arg\left(\sum_{t=0}^{KM-1} g(t)e^{-j2\pi\frac{(p-\frac{N}{4})t}{MN/2}}\right)$$

wherein K is a coverage factor characteristic of the FBMC modulator, g(t) is an impulse response of a prototype filter used in the FBMC modulator, and p and t are both integers.

9. The transmitter according to claim 1, wherein the amplitude pre-compensation is made by performing a Hadamard product of the modulation symbols matrix D and a matrix $\Gamma$ with size (NM/2)×P for which elements are defined as follows:

$$\Gamma_{k\frac{N}{2}+p,t} = \left(\left|\sum_{t=0}^{KM-1} g(t)e^{-j2\pi\frac{(p-\frac{N}{4})t}{MN/2}}\right|\right)^{-1}$$

wherein K is a coverage factor characteristic of the FBMC modulator, g(t) is an impulse response of a prototype filter used in the FBMC modulator, and p and t are both integers.

10. A communication system comprising the transmitter according to claim 1, and further comprising a receiver including a sampler to sample a signal received in base band, the receiver being configured to eliminate cyclic prefixes and suffixes, and to perform a fast Fourier transform (FFT) module with size NM/2 on the signal thus obtained every (N+$N_{GI}$)M/2 samples, wherein $N_{GI}$ is a sum of the size of the cyclic prefix and the size of the cyclic suffix.

11. The communication system according to claim 10, wherein the modulation symbols frame comprises a plurality of pilot symbols and the receiver comprises a channel estimator connected to outputs from the FFT module to estimate channel coefficients for each sub-carrier, an equalizer at an output from the FFT module to receive said channel coefficients and equalizing outputs from the FFT module to make a sub-carrier equalizing.

12. The communication system according to claim 10, wherein the transmitter comprises a plurality of discrete Fourier transform (DFT) modules before a phase pre-compensation module and an amplitude pre-compensation module, each DFT module receiving symbol blocks addressed to or sent by a user, the modulation symbols matrix being obtained from outputs from said DFT modules, and the receiver comprises a same plurality of inverse discrete Fourier transform (IDFT) modules downstream from the FFT module, each IDFT module of the receiver being associated with a DFT module of the transmitter and performing an IDFT with a same size as the FFT module at an output from the FFT module, to provide an estimate of said symbol blocks.

* * * * *